US012334021B2

(12) United States Patent
Yun et al.

(10) Patent No.: US 12,334,021 B2
(45) Date of Patent: Jun. 17, 2025

(54) DISPLAY APPARATUS CAPABLE OF CHANGING RESOLUTION IN RESPONSE TO INPUT IMAGE AND DRIVING METHOD THEREOF

(71) Applicant: LG Display Co., Ltd., Seoul (KR)

(72) Inventors: Jun Woo Yun, Paju-si (KR); Tae Gung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/507,987

(22) Filed: Nov. 13, 2023

(65) Prior Publication Data

US 2024/0221680 A1 Jul. 4, 2024

(30) Foreign Application Priority Data

Dec. 29, 2022 (KR) ........................ 10-2022-0188921

(51) Int. Cl.
*G09G 3/3266* (2016.01)

(52) U.S. Cl.
CPC ....... *G09G 3/3266* (2013.01); *G09G 2310/08* (2013.01); *G09G 2340/0407* (2013.01)

(58) Field of Classification Search
CPC ....... G09G 2310/08; G09G 2340/0407; G09G 2360/02; G09G 3/20; G09G 3/22; G09G 3/3266; G09G 3/3611; G09G 3/3648
See application file for complete search history.

(56) References Cited

U.S. PATENT DOCUMENTS

| | | | | |
|---|---|---|---|---|
| 6,088,014 | A | 7/2000 | Furuhashi et al. | |
| 2002/0012006 | A1 | 1/2002 | Yamada et al. | |
| 2002/0075289 | A1* | 6/2002 | Hatori | G09G 5/14 345/698 |
| 2007/0152944 | A1* | 7/2007 | Kwon | G09G 3/3677 345/98 |
| 2023/0222993 | A1* | 7/2023 | Sim | G09G 5/005 345/698 |
| 2023/0245633 | A1* | 8/2023 | Lee | G09G 5/227 345/660 |

* cited by examiner

*Primary Examiner* — Chun-Nan Lin
(74) *Attorney, Agent, or Firm* — Seed IP Law Group LLP

(57) ABSTRACT

A display apparatus includes a display panel configured to display an image, a gate driver configured to supply gate signals to the display panel, a timing controller configured to control an output pattern of the gate driver so that the gate signals are applied one by one per one gate line or are applied one by one per two gate lines, based on an image input from the outside, and a resolution resizer configured to change at least one of a horizontal resolution and a vertical resolution, based on the image input from the outside.

9 Claims, 17 Drawing Sheets

(Input) 1 : 2 (Output)

(Input) 1 : 1.5 (Output)

DISPLAY APPARATUS CAPABLE OF CHANGING RESOLUTION IN RESPONSE TO INPUT IMAGE AND DRIVING METHOD THEREOF

CROSS-REFERENCE TO RELATED APPLICATIONS

This application claims the benefit of the Korean Patent Application No. 10-2022-0188921 filed on Dec. 29, 2022, which is hereby incorporated by reference as if fully set forth herein.

BACKGROUND

Technical Field

The present disclosure relates to a display apparatus and a driving method thereof.

Description of the Related Art

As information technology advances, the market for display apparatuses which are connection mediums connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which supplies power to the display panel or the driver.

In such display apparatuses, when the driving signal (for example, a gate signal and a data signal) is supplied to each of the subpixels provided in the display panel, a selected subpixel may transmit light or may self-emit light, and thus, an image may be displayed.

BRIEF SUMMARY

The present disclosure may easily implement an image input at various frequencies and resolutions, minimize a degradation in image quality, and decrease the cost for developing products.

To achieve these objects and other advantages and in accordance with the purpose of the disclosure, as embodied and broadly described herein, a display apparatus includes a display panel configured to display an image, a gate driver configured to supply gate signals to the display panel, a timing controller configured to control an output pattern of the gate driver so that the gate signals are applied one by one per one gate line or are applied one by one per two gate lines, based on an image input from the outside, and a resolution resizer configured to change at least one of a horizontal resolution and a vertical resolution, based on the image input from the outside.

When an image having a lower resolution than a displayable resolution of the display panel is input, the resolution resizer may change at least one of the horizontal resolution and the vertical resolution, and the timing controller may control the gate driver so that the output pattern of the gate driver is changed, based on changing of a resolution by the resolution resizer.

When a first image having a lower resolution than a displayable resolution of the display panel is input, the resolution resizer may change the horizontal resolution, and when changing of the horizontal resolution is performed by the resolution resizer, the timing controller may control the gate driver so that the gate signals are applied one by one per at least two gate lines.

When a second image having a lower resolution than a displayable resolution of the display panel and a higher resolution than a resolution of the first image is input, the resolution resizer may change the horizontal resolution and the vertical resolution, and when changing of the horizontal resolution and the vertical resolution is performed by the resolution resizer, the timing controller may control the gate driver so that a portion where the gate signals are applied one by one per one gate line and a portion, where the gate signals are applied one by one per at least two gate lines, are provided.

When changing of the horizontal resolution and the vertical resolution is performed by the resolution resizer, the timing controller may change a driving mode so that a frame of the display panel is divided into a first group frame and a second group frame, which are continuous, and driven.

Based on the dividing of the frame into the first group frame and the second group frame, the timing controller may control the gate driver so that a position of a portion where the gate signals are applied one by one per one gate line and a position of a portion, where the gate signals are applied one by one per at least two gate lines, are alternated.

A portion where the gate signals are applied one by one per one gate line and a portion, where the gate signals are applied one by one per at least two gate lines, may be three gate lines vertically adjacent to one another in the display panel.

In another aspect of the present disclosure, a driving method of a display apparatus includes changing at least one of a horizontal resolution and a vertical resolution when an image having a lower resolution than a displayable resolution of a display panel is input and performing control so that gate signals are applied to the display panel one by one per one gate line or are applied to the display panel one by one per at least two gate lines, based on changing of a resolution of the image.

When the horizontal resolution and the vertical resolution are changed based on the image, a portion where the gate signals are applied one by one per one gate line and a portion, where the gate signals are applied one by one per at least two gate lines, may be provided.

When the horizontal resolution and the vertical resolution are changed based on the image, the display panel may be driven by dividing a frame into a first group frame and a second group frame which are continuous.

Based on the dividing of the frame into the first group frame and the second group frame, a position of a portion where the gate signals are applied one by one per one gate line and a position of a portion, where the gate signals are applied one by one per at least two gate lines, may be alternated.

A portion where the gate signals are applied one by one per one gate line and a portion, where the gate signals are applied one by one per at least two gate lines, may be three gate lines vertically adjacent to one another in the display panel.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light on the basis of an inorganic light emitting diode or an organic light emitting diode will be described for example. A light emitting display apparatus may be implemented based on an inorganic light emitting diode, or may be implemented based on an organic light emitting diode. Hereinafter, for convenience of description, an example will be described where a light emitting display apparatus is implemented based on an organic light emitting diode.

Figure 1:
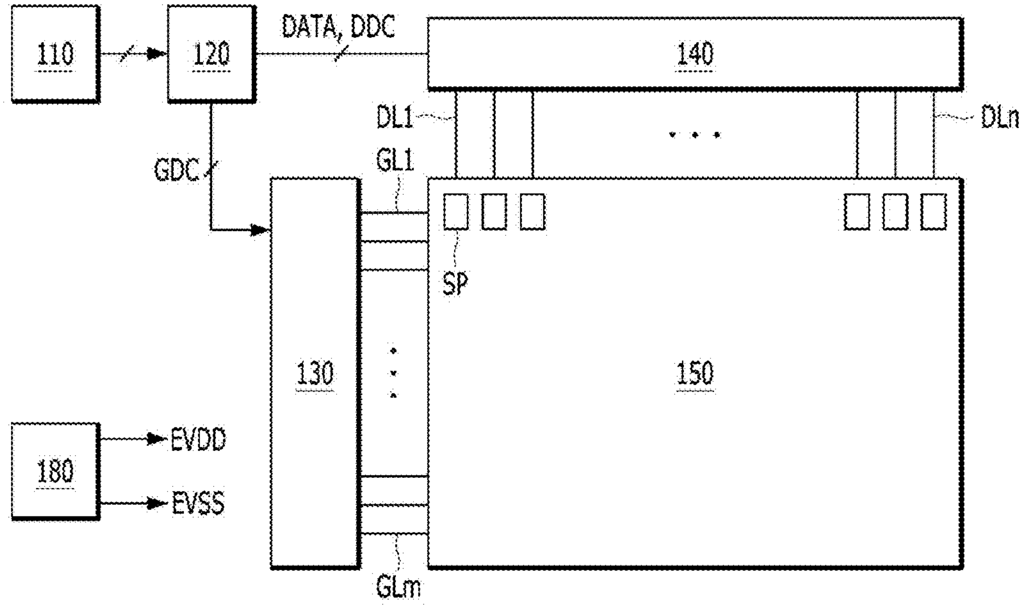
FIG. 1 is a block diagram schematically illustrating a display apparatus.
Figure 2:
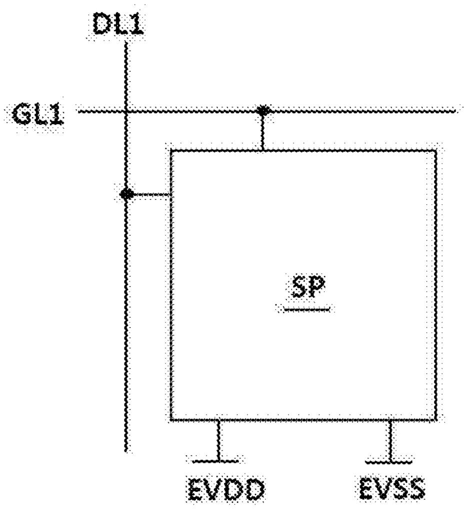
FIG. 2 is a block diagram schematically illustrating a subpixel illustrated in FIG. 1.

FIG. 1 is a block diagram schematically illustrating a display apparatus, and FIG. 2 is a block diagram schematically illustrating a subpixel illustrated in FIG. 1.

As illustrated in FIGS. 1 and 2, the light emitting display apparatus may include a video supply unit 110, a timing controller 120, a gate driver 130, a data driver 140, a display panel 150, and a power supply 180.

The video supply unit 110 (a set or a host system) may output a video data signal supplied from the outside or a video data signal and various driving signals stored in an internal memory thereof. The video supply unit 110 may supply a data signal and the various driving signals to the timing controller 120.

The timing controller 120 may output a gate timing control signal GDC for controlling an operation timing of the gate driver 130, a data timing control signal DDC for controlling an operation timing of the data driver 140, and various synchronization signals. The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The gate driver 130 may output a gate signal (or a gate voltage) in response to the gate timing control signal GDC supplied from the timing controller 120. The gate driver 130 may supply the gate signal to a plurality of subpixels, included in the display panel 150, through a plurality of gate lines GL1 to GLm. The gate driver 130 may be implemented as an IC type or may be directly provided on the display panel 150 in a gate in panel (GIP) type, but is not limited thereto.

In response to the data timing control signal DDC supplied from the timing controller 120, the data driver 140 may sample and latch the data signal DATA, convert a digital data signal into an analog data voltage on the basis of a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate a high voltage and a low voltage on the basis of an external input voltage supplied from the outside and may respectively output the high voltage and the low voltage through a high voltage line EVDD and a low voltage line EVSS. The power supply unit 180 may generate and output a voltage (for example, a gate voltage including a gate high voltage and a gate low voltage) needed for driving of the gate driver 130 or a voltage (for example, a drain voltage including a drain voltage and a half drain voltage) needed for driving of the data driver 140, in addition to the high voltage and the low voltage.

The display panel 150 may display an image on the basis of a driving signal, including the gate signal and a data voltage, and a driving voltage including a high level voltage and a low level voltage. Subpixels of the display panel 150 may self-emit light. The display panel 150 may be manufactured based on a substrate, having stiffness or flexibility, such as glass, silicon, or polyimide. Also, a pixel emitting light may include red, green, and blue subpixels, or may include red, green, blue, and white subpixels.

For example, one subpixel SP may be connected with a first data line DL1, a first gate line GL1, the high voltage line EVDD, and the low voltage line EVSS and may include a pixel circuit including a switching transistor, a driving transistor, a capacitor, and an organic light emitting diode. The subpixel SP used in the light emitting display apparatus may self-emit light, and thus, may be complicated in configuration of a circuit. Also, the subpixel SP may include an organic light emitting diode emitting light and a compensation circuit which compensates for a degradation in a driving transistor which supplies a driving current needed for driving of the organic light emitting diode. Accordingly, the subpixel SP is simply illustrated in a block shape.

In the above description, each of the timing controller 120, the gate driver 130, and the data driver 140 has been described as an individual element. However, based on an implementation type of a light emitting display apparatus, one or more of the timing controller 120, the gate driver 130, and the data driver 140 may be integrated into one IC.

Figure 3:
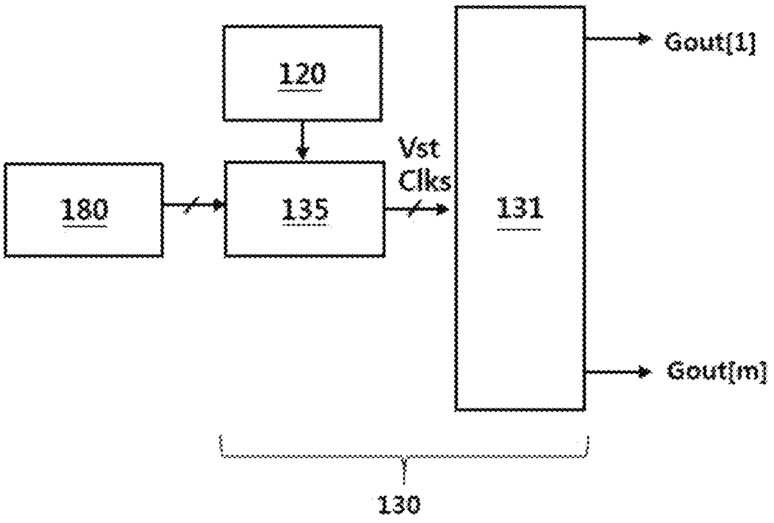
FIGS. 3 and 4 are diagrams for describing a configuration of a gate driver of a gate in panel (GIP) type.
Figure 4:
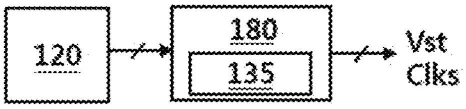
Figure 5:
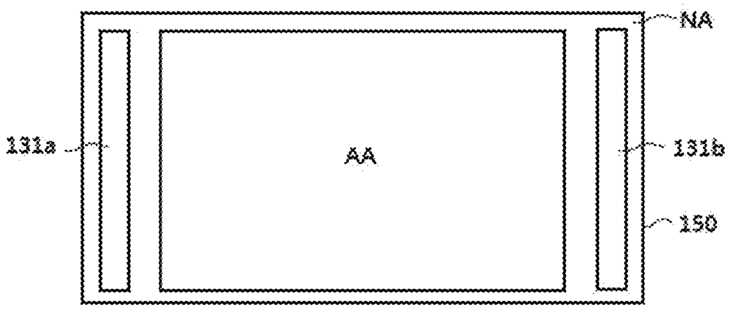
FIG. 5 is a diagram illustrating an arrangement example of the gate driver of the GIP type.

FIGS. 3 and 4 are diagrams for describing a configuration of a gate driver of a GIP type, and FIG. 5 is a diagram illustrating an arrangement example of the gate driver of the GIP type.

As illustrated in FIG. 3, the gate driver 130 of the GIP type may include a shift register 131 and a level shifter 135. The level shifter 135 may generate clock signals Clks and a start signal Vst, based on signals and voltages respectively output from the timing controller 120 and the power supply 180. The shift register 131 may operate based on the clock signals Clks and the start signal Vst output from the level shifter 135 and may output gate signals Gout[ 1] to Gout[m].

As illustrated in FIGS. 3 and 4, the level shifter 135 may be independently provided as an IC type unlike the shift register 131, or may be included in the power supply 180. However, this may be merely an embodiment, and the present disclosure is not limited thereto.

As illustrated in FIG. 5, in the gate driver of the GIP type, first and second shift registers 131*a* and 131*b* outputting gate signals may be disposed in a non-display area NA of the display panel 150. The first and second shift registers 131*a* and 131*b* may be provided as a thin film type on the display panel 150, based on the GIP type. An example is illustrated where the first and second shift registers 131*a* and 131*b* are respectively disposed in left and right non-display areas NA of the display panel 150, but the present disclosure is not limited thereto.

Figure 6:
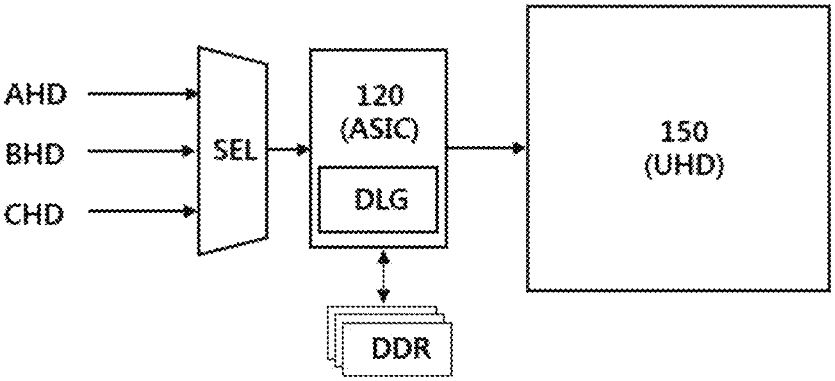
FIGS. 6, 7 and 8 are diagrams for describing a function of a display apparatus according to an embodiment of the present disclosure.
Figure 7:
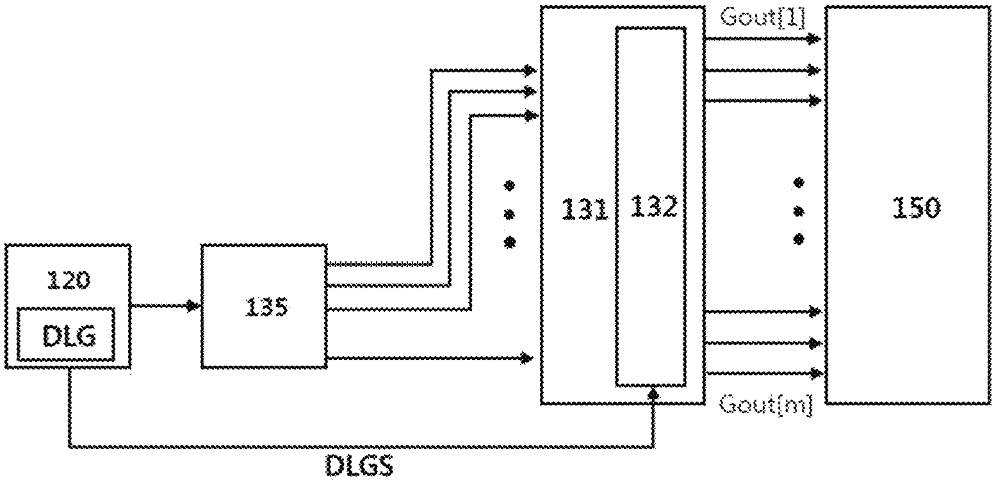
Figure 8:
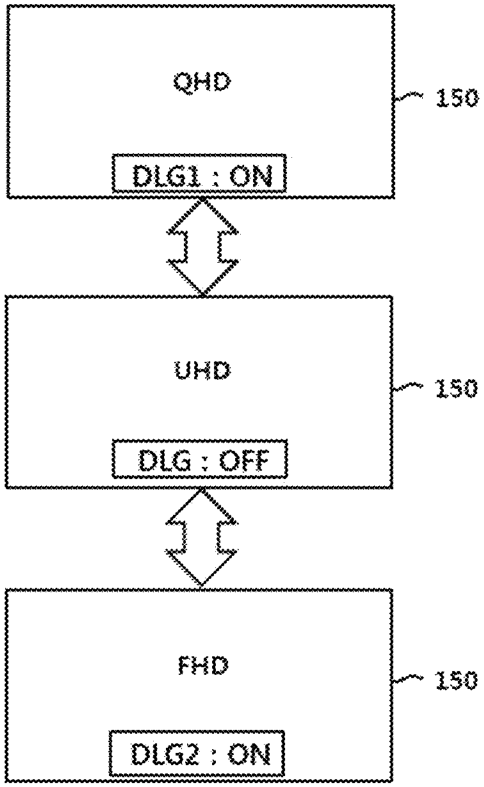

FIGS. 6 to 8 are diagrams for describing a function of a display apparatus according to an embodiment of the present disclosure.

As illustrated in FIG. 6, the display apparatus according to an embodiment of the present disclosure may display an image, which has various resolutions and is input from the outside, on the display panel 150. To this end, the display panel 150 may be implemented to display an UHD image.

The display apparatus may selectively output one image source of image sources respectively having a first resolution AHD, a second resolution BHD, and a third resolution CHD. To this end, the display apparatus may include a selector SEL which selects and outputs one image source from among the image sources respectively having the first resolution AHD, the second resolution BHD, and the third resolution CHD, but in a case where an image is selectively input, the selector SEL may be omitted or may be included in an image source.

The display apparatus may include a mode change unit DLG for changing a driving condition so as to implement an image having a specific resolution on the display panel 150. The mode change unit DLG may be included the timing controller 120 (ASIC) for controlling the display panel 150 and a memory DDR. For example, the mode change unit DLG may change a generating condition of a mode change signal, based on whether a resolution of an image input from the outside is the first resolution AHD, the second resolution BHD, or the third resolution CHD.

Hereinafter, for convenience of description, an example will be described where the first resolution AHD is quad high definition (QHD) (2560*1440), the second resolution BHD is full high definition (FHD) (1920*1080), and the third resolution CHD is ultra-high definition; (UHD) (3840*2160). Also, an example where the mode change unit DLG is included in the timing controller 120 may be described. However, the mode change unit DLG may be included in the image supply unit 110. In this case, the mode change unit DLG may be included in the timing controller 120, but may be implemented as a type where the mode change signal applied from the outside is intactly output (Output as is, without any changes) to the inside or the outside.

As illustrated in FIGS. 7 and 8, the mode change unit DLG may supply the mode change signal through a signal line DLGS connected with an output change circuit unit 132. An example is illustrated where the output change circuit unit 132 is included in the shift register 131, but this may be included in the level shifter 135.

When a resolution of an image input from the outside corresponds to UHD, the mode change unit DLG may not output a mode change signal DLG:OFF. When a resolution of an image input from the outside corresponds to QHD, the mode change unit DLG may output a first mode change signal DLG1:ON. When a resolution of an image input from the outside corresponds to FHD, the mode change unit DLG may output a second mode change signal DLG2:ON.

Figure 9:
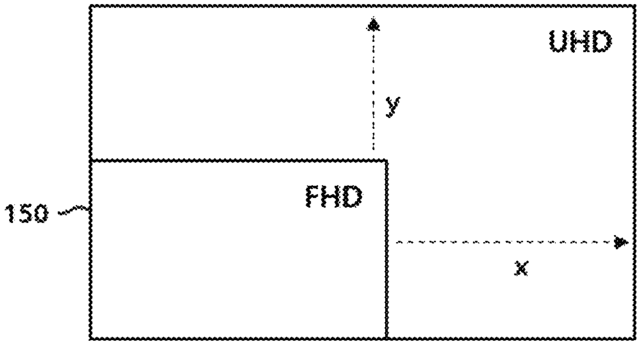
FIGS. 9 and 10 are diagrams for describing a method of implementing a full high definition (FHD) image on an ultra-high definition (UHD) display panel, according to an embodiment of the present disclosure.
Figure 10:
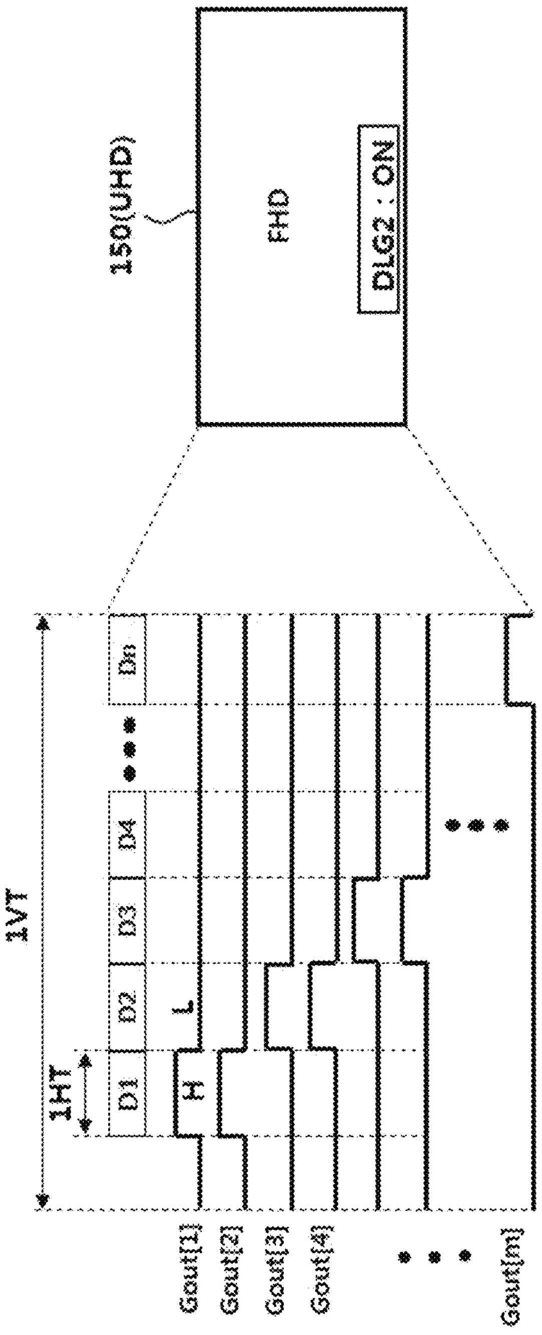

FIGS. 9 and 10 are diagrams for describing a method of implementing an FHD image on a UHD display panel 150, according to an embodiment of the present disclosure.

As illustrated in FIG. 9, an FHD image may be lower in resolution than an UHD image. Therefore, in order to display the FHD image on the UHD display panel 150, when a horizontal resolution “x” and a vertical resolution “y” should be extended, it may be required to change a ratio of an input to an output to 1:2.

As illustrated in FIGS. 7, 8, and 10, according to an embodiment, when the FHD image is input to the timing controller 120, the timing controller 120 may extend the horizontal resolution. Also, in order to extend the vertical resolution by twice compared to a previous resolution, the timing controller 120 may control the output change circuit unit 132, based on the mode change unit DLG. This may be referred to as a gate line doubling method using a device provided outside the timing controller, so as to extend the vertical resolution.

As illustrated in FIG. 10, when a resolution of an input image corresponds to FHD, the mode change unit DLG may output the second mode change signal DLG2:ON. When the second mode change signal DLG2:ON is output from the mode change unit DLG, the shift register 131 may sequentially divide and output gate signals Gout[1] to Gout[m] which are to be supplied to the display panel 150 and may output one gate signal per two gate lines.

Accordingly, two gate lines vertically adjacent to each other may receive one gate signal which is identically generated, and thus, a vertical resolution may be extended by twice compared to a previous resolution.

For example, a first gate line and a second gate line may be simultaneously driven based on one gate signal which is identically generated like “Gout[1] and Gout[2]=H.” In this case, subpixels connected with the first gate line and the second gate line may be simultaneously supplied with the same data voltage D1 during 1HT (horizontal time), and thus, a horizontal resolution may be extended by twice compared to a previous resolution. In output patterns of gate signals, “Gout[1] and Gout[2]=H” may be generated together and then “Gout[3] and Gout[4]=H” may be generated together, and in this manner, gate signals may be sequentially output up to “Gout[m].”

In FIG. 10, as the UHD display panel 150 is driven at a driving frequency of 480 Hz, an example may be described where 1VT (vertical time)=2.8 ms@480 Hz and 1HT (horizontal time)=1.87 μs.

Figure 11:
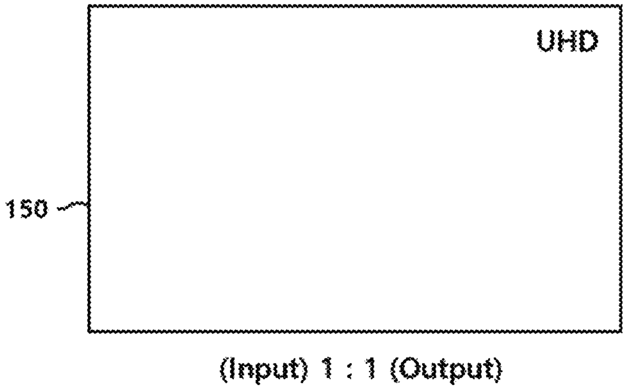
FIGS. 11 and 12 are diagrams for describing a method of implementing an UHD image on an UHD display panel, according to an embodiment of the present disclosure.
Figure 12:
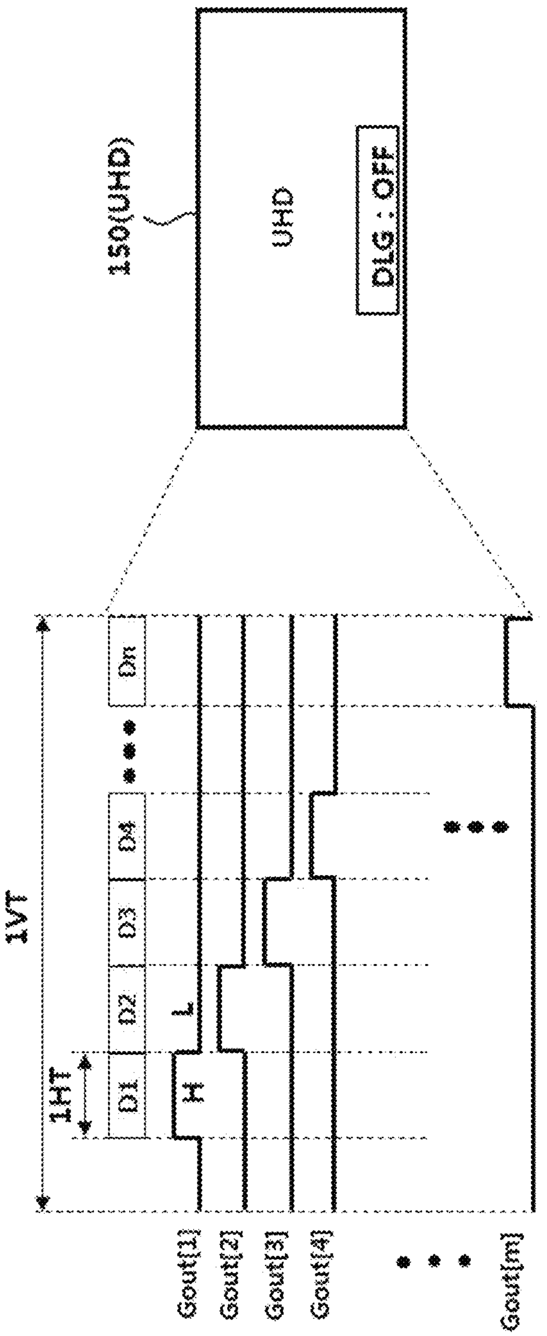

FIGS. 11 and 12 are diagrams for describing a method of implementing an UHD image on an UHD display panel 150, according to an embodiment of the present disclosure.

As illustrated in FIG. 11, an UHD image may be intactly displayed on the UHD display panel 150, and thus, a ratio of an input to an output may be 1:1 and it may not be required to change a resolution of an image.

As illustrated in FIGS. 7, 8, and 12, according to an embodiment, in a case where an UHD image is input, the timing controller 120 may perform only necessary image processing and may intactly output the UHD image. Also, the timing controller 120 may not use the mode change unit DLG, and thus, the output change circuit unit 132 may be in a state where an operation is not performed.

As illustrated in FIG. 12, when a resolution of an input image corresponds to UHD, because the mode change signal DLG:OFF is not output, the shift register 131 may sequentially divide and output gate signals Gout[1] to Gout[m] which are to be supplied to the display panel 150 and may output one gate signal per two gate lines. In this case, subpixels connected with the first gate line may be simultaneously supplied with one data voltage D1 during 1HT. In output patterns of gate signals, "Gout[1]=H" may be generated together and then "Gout[2]=H" may be generated together, and in this manner, gate signals may be sequentially output up to "Gout[m]".

FIGS. 13 to 16 are diagrams for describing a method of implementing a QHD image on an UHD display panel 150, according to an embodiment of the present disclosure.

Figure 13:
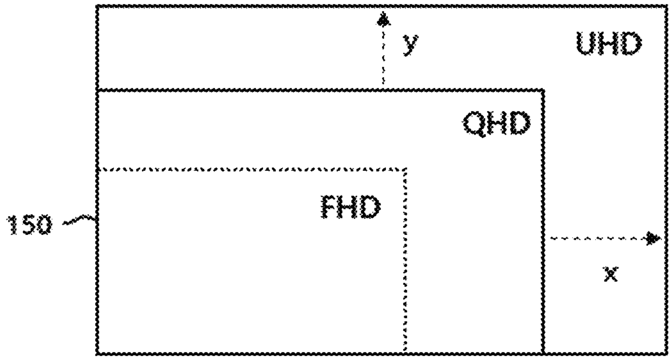
FIGS. 13, 14, 15 and 16 are diagrams for describing a method of implementing a quad high definition (QHD) image on an UHD display panel, according to an embodiment of the present disclosure.

As illustrated in FIG. 13, a QHD image may be higher in resolution than an FHD image and may be lower in resolution than a UHD image. Therefore, in order to display the QHD image on the UHD display panel 150, when a horizontal resolution "x" and a vertical resolution "y" should be extended, it may be required to change a ratio of an input to an output to 1:1.5.

As illustrated in FIGS. 7, 8, 14, and 15, according to an embodiment, when the QHD image is input to the timing controller 120, the timing controller 120 may extend the horizontal resolution. Also, in order to extend the vertical resolution by 1.5 times compared to a previous resolution, the timing controller 120 may control the output change circuit unit 132, based on the mode change unit DLG. This may be referred to as a gate line doubling method using a device provided outside the timing controller, so as to extend the vertical resolution.

Figure 14:
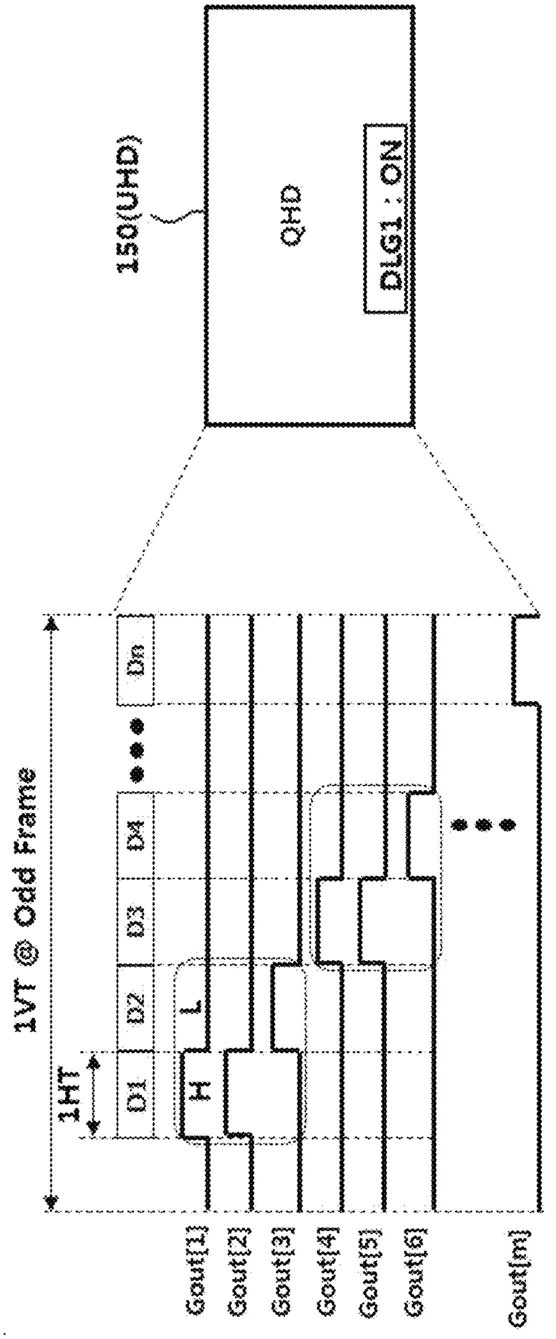
Figure 15:
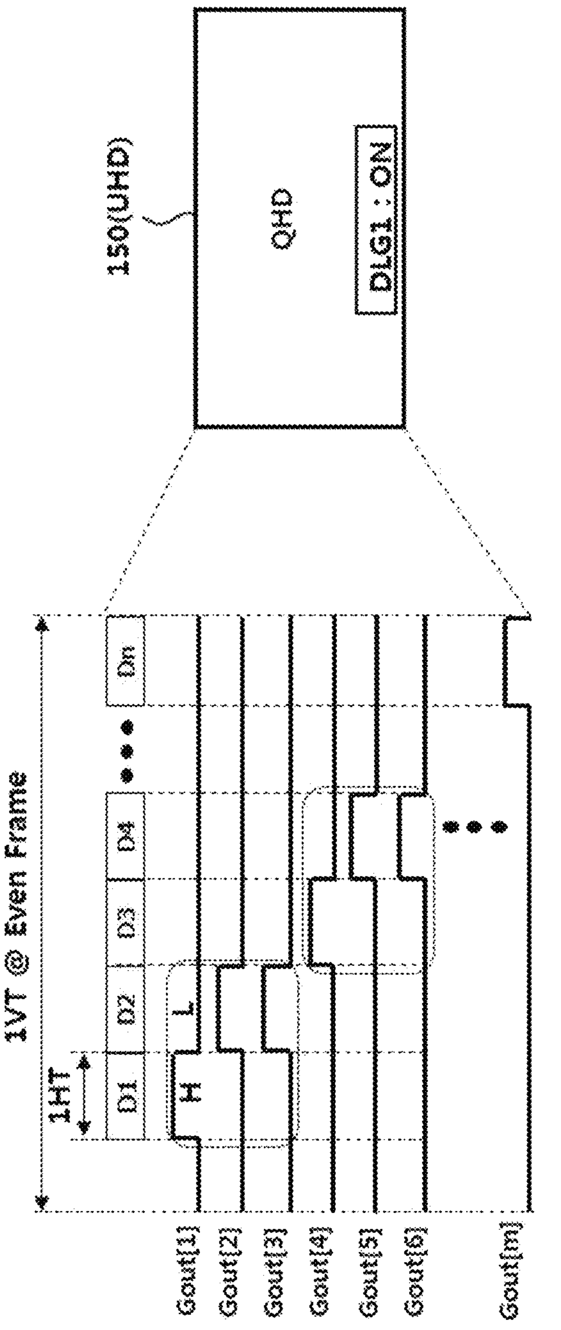

As illustrated in FIGS. 14 and 15, when a resolution of an input image corresponds to QHD, the mode change unit DLG may output a first mode change signal DLG1:ON. When the first mode change signal DLG1:ON is output from the mode change unit DLG, the display apparatus may change a driving mode so that a frame is divided into a first group frame and a second group frame and driven. The first group frame and the second group frame may be two continuous frames. Hereinafter, for convenience of description, the first group frame may be defined as an odd frame, and the second group frame may be defined as an even frame.

When the first mode change signal DLG1:ON is output from the mode change unit DLG, the shift register 131 may sequentially and divisionally output the gate signals Gout[1] to Gout[m] which are to be supplied to the display panel 150 and may change a position at which one gate signal is output per two gate lines and a position at which one gate signal is output per one gate line.

Therefore, a frame may be divided into an odd frame and an even frame, and two gate lines vertically adjacent to each other may receive one gate signal which is identically generated and then may receive gate signals which are divided and generated, whereby a vertical resolution may be extended by 1.5 times compared to a previous resolution.

For example, during an odd frame, a first gate line and a second gate line may be simultaneously driven based on one gate signal which is identically generated like "Gout[1] and Gout[2]=H". In this case, subpixels connected with the first gate line and the second gate line may be simultaneously supplied with the same data voltage D1 during 1HT (horizontal time), and thus, a horizontal resolution may be extended by twice compared to a previous resolution. However, during an even frame, the first gate line and the second gate line may be driven at different times, based on two gate signals which are divided and generated like "Gout[1]=H and Gout[2]=L". In this case, the subpixels connected with the first gate line and the second gate line may be simultaneously supplied with different data voltage D1 and D2 at different times during 1HT (horizontal time), and thus, a horizontal resolution may be maintained by once like previous resolution.

In output patterns of gate signals, during an odd frame, "Gout[1] and Gout[2]=H" may be generated together and then "Gout[3]=H" may be generated, and during an even frame, "Gout[1]=H" may be generated and then "Gout[2] and Gout[3]=H" may be generated together. Such an output pattern may be alternately performed and may be performed up to "Gout[m]".

In FIGS. 14 and 15, as the UHD display panel 150 is driven at a driving frequency of 360 Hz, an example may be described where 1VT (vertical time)=2.77 ms@360 Hz and 1HT (horizontal time)=1.87 μs.

Figure 16:
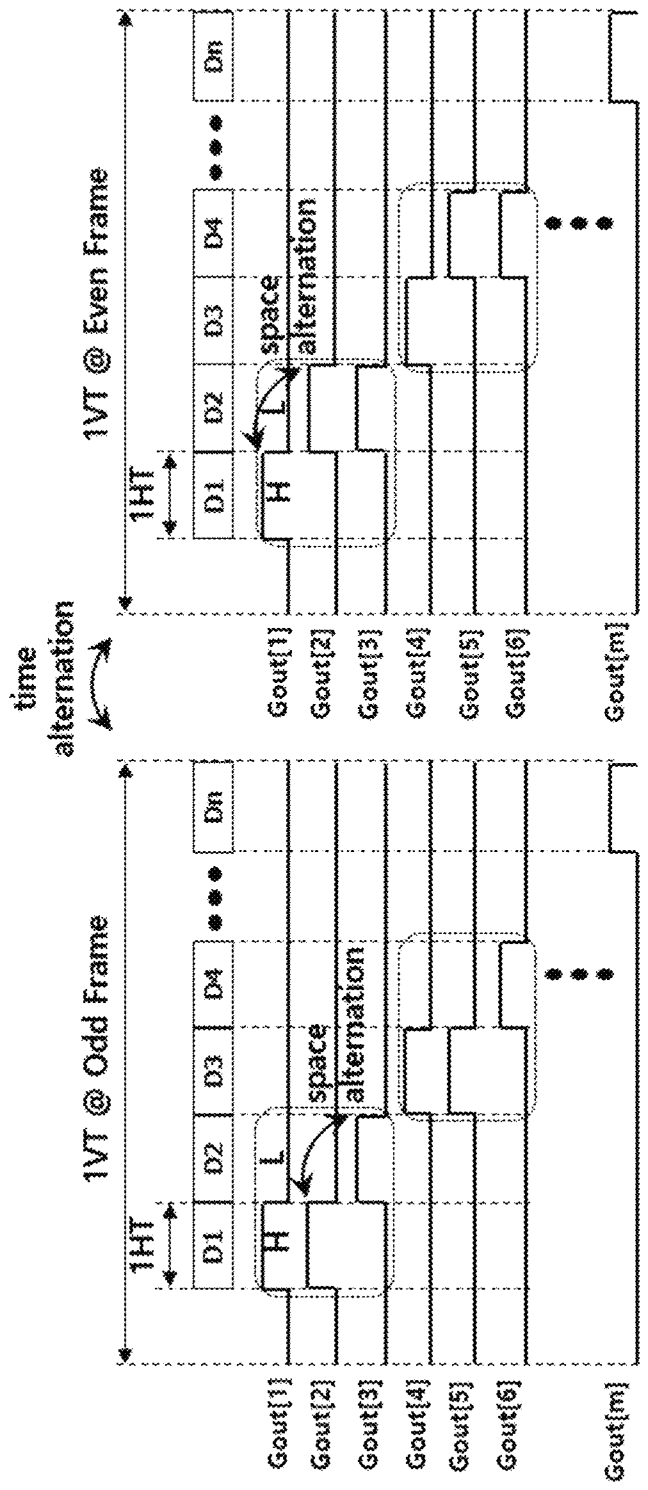

As illustrated in FIG. 16, according to an embodiment, it may be described (time alternation) that output times of gate signals are alternated between an odd frame and an even frame. Also, it may be described (space alternation) that output spaces (positions) of gate signals are alternated whenever frames are alternated. In this case, as seen in "Gout[1] to Gout[3]" or "Gout[4] to Gout[6]," it may be described that space alternation is performed by units of three gate lines which are vertically adjacent to one another and are paired.

FIGS. 17 to 20 are diagrams for describing a resolution resizing method for displaying a QHD image on an UHD display panel, according to an embodiment of the present disclosure.

Figure 17:
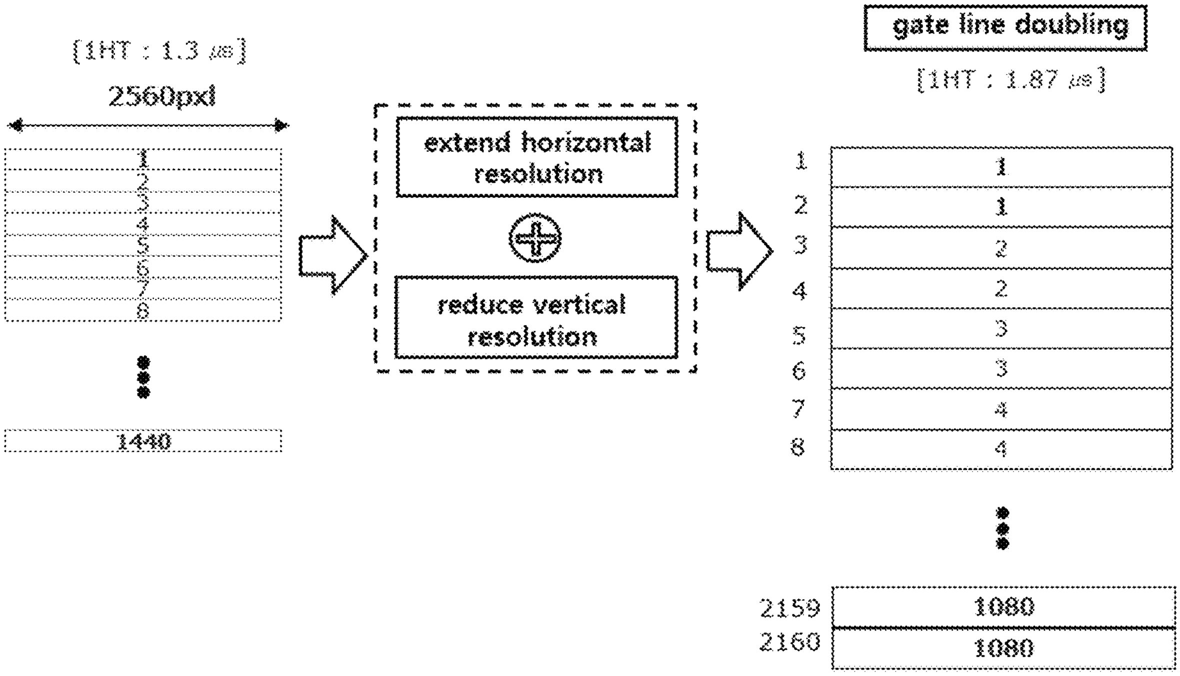
FIGS. 17, 18, 19 and 20 are diagrams for describing a resolution resizing method for displaying a QHD image on an UHD display panel, according to an embodiment of the present disclosure.
Figure 18:
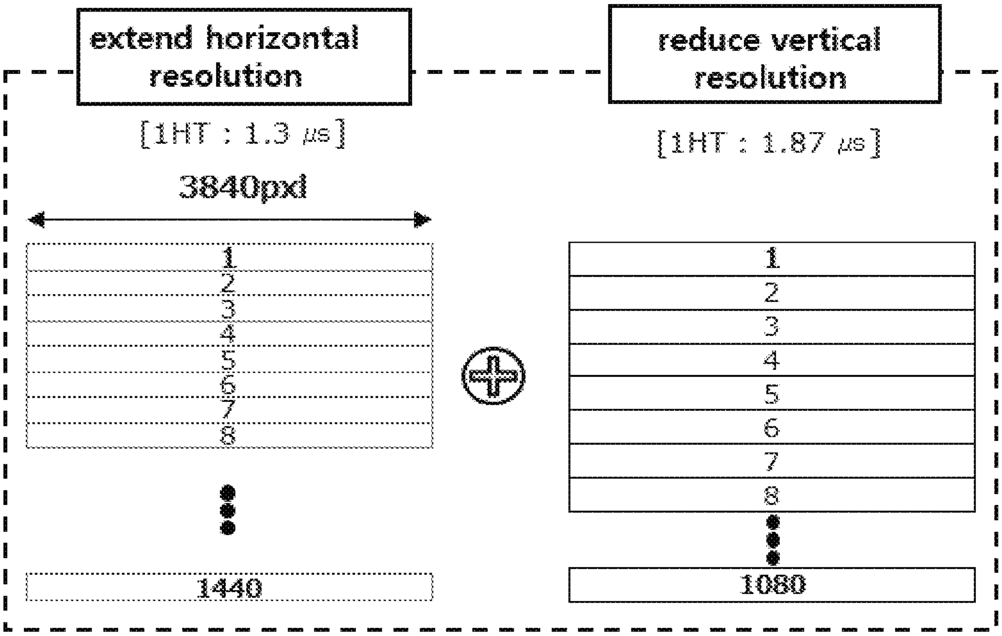

As illustrated in FIGS. 17 and 18, in an embodiment, in order to display a QHD image on a UHD display panel, a horizontal resolution may be extended, a vertical resolution may be reduced, an image may be displayed, and doubling of a gate line may be performed. Here, an extension of the horizontal resolution and a reduction in the vertical resolution may be performed by the timing controller or the image supply unit, and doubling of a gate line may be performed by the gate driver.

A QHD image may be defined as 2560*1440. The horizontal resolution may be defined by the number of pixels (2560 pxl), and the vertical resolution may be defined by the number of gate lines. Also, 1HT of the QHD image may be 1.3 μs.

In order to display a QHD image on a UHD display panel, it may be required to extend a horizontal resolution of a UHD image by the number of pixels (3840 pxl) defining the horizontal resolution of the UHD image. To this end, the timing controller may extend (2560→3840) the horizontal resolution of the QHD image by 1.5 times through horizontal image processing on the QHD image input thereto. Even when the horizontal resolution of the QHD image is extended, 1HT may maintain 1.3 μs like a previous resolution.

Unlike an FHD image, it may be difficult to adjust the vertical resolution of the QHD image to the form of the UHD image by using only a gate line doubling method. Therefore, the timing controller may reduce (1440→1080) the vertical resolution of the QHD image to an FHD class through vertical image processing. When the vertical resolution of the QHD image is extended, 1HT may be changed to 1.87 μs, based thereon.

As described above, when changing of resolution is completely performed on the horizontal resolution and the vertical resolution of the QHD image, the timing controller may control outputs of data signals and gate signals in the form of expressing an image corresponding to 3840*1080. As described above, in an embodiment, output patterns of gate signals output from the gate driver may be changed based on the gate line doubling method, and thus, an image displayed on the display panel may finally have a resolution (3840*2160) corresponding to the UHD image.

Figure 19:
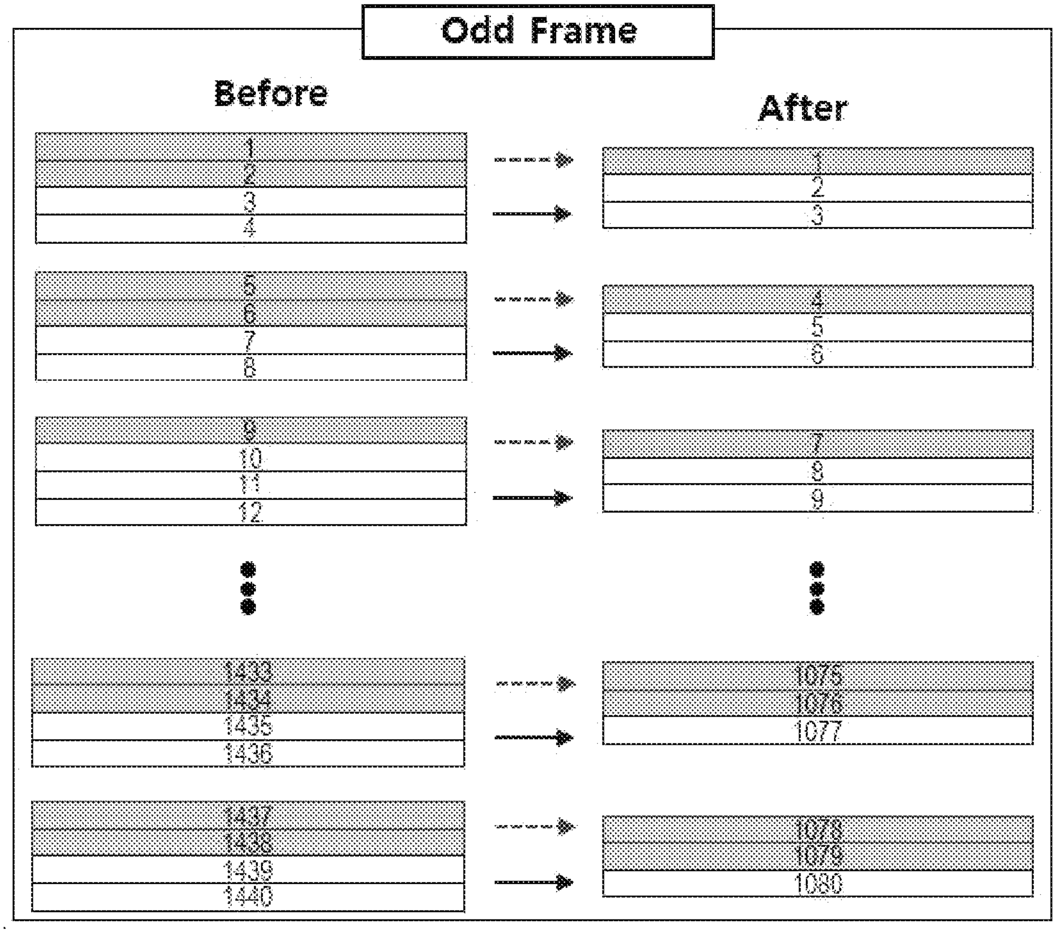
Figure 20:
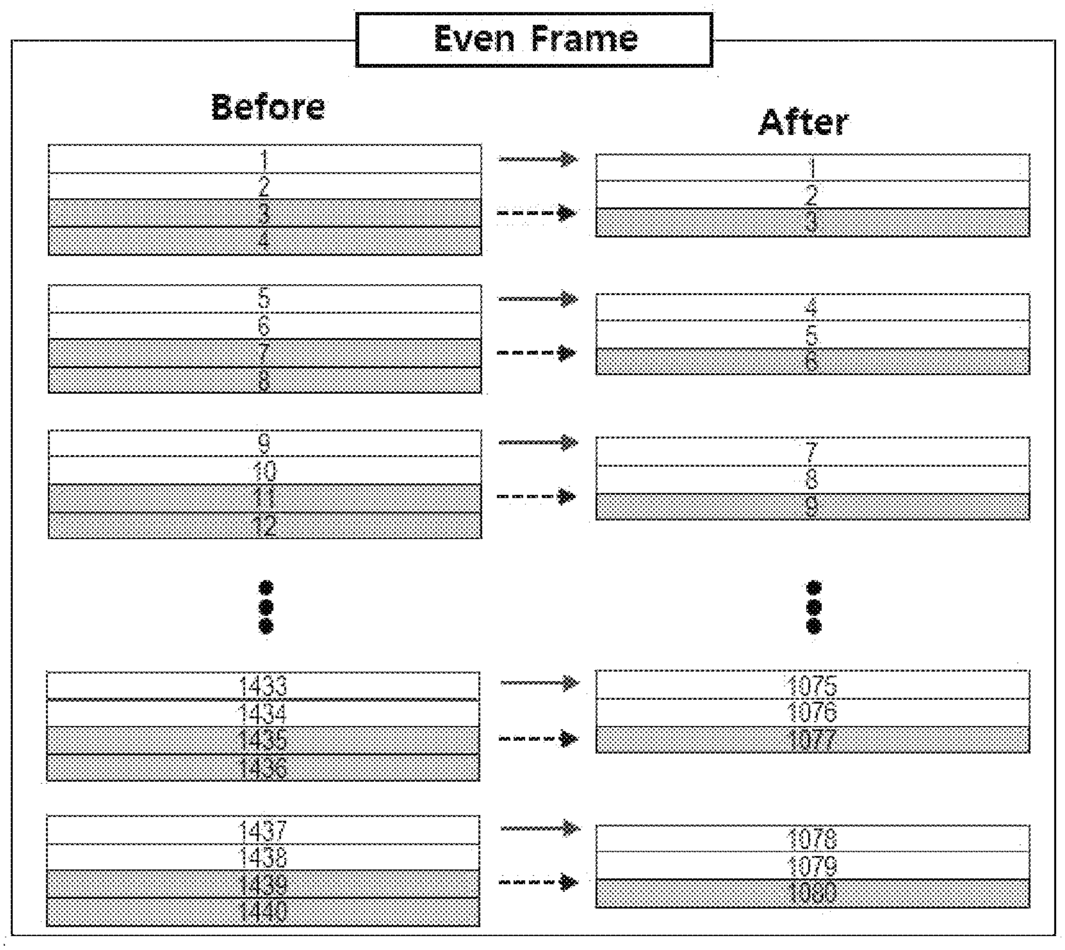

As illustrated in FIGS. 19 and 20, in order to reduce (1440→1080) the vertical resolution of the QHD image to the FHD class, a frame may be configured with an odd frame and an even frame, and 1HT may be changed from 1.3 μs to 1.87 μs.

In an odd frame, images 1 and 2 of first and second lines may be configured to be displayed as the image 1 of the first line, and images 3 and 4 of third and fourth lines may be configured to be displayed as the images 2 and 3 of the second and third lines. Also, in an even frame, images 1 and 2 of first and second lines may be configured to be intactly displayed as the images 1 and 2 of the first and second lines, and images 3 and 4 of third and fourth lines may be configured to be displayed as the image 3 of the third line.

Such a method may be implemented as an asymmetrical resolution implementation method which allocates images of four lines as images of three lines and alternately performs the allocation to reduce a vertical resolution to 4:3, thereby minimizing (minimizing a reduction in image quality) the loss of an image in a process of changing the QHD image to the UHD image.

Figure 21:
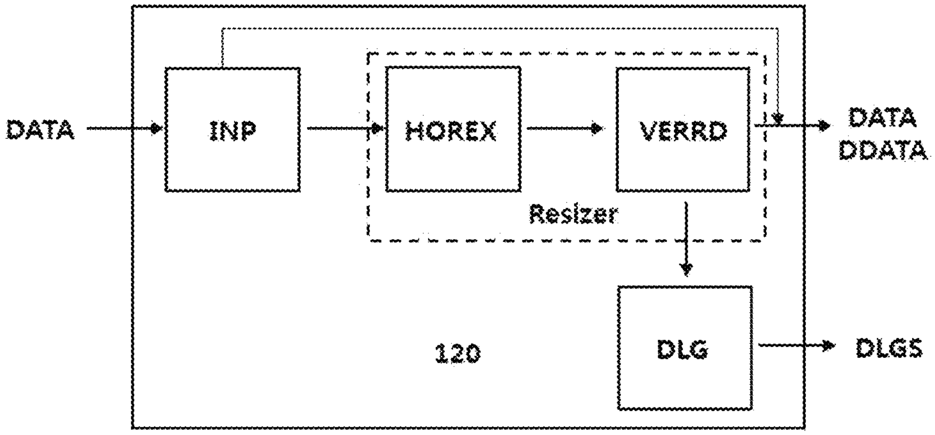
FIGS. 21 and 22 are diagrams illustrating some of elements of an apparatus according to an embodiment of the present disclosure.
Figure 22:
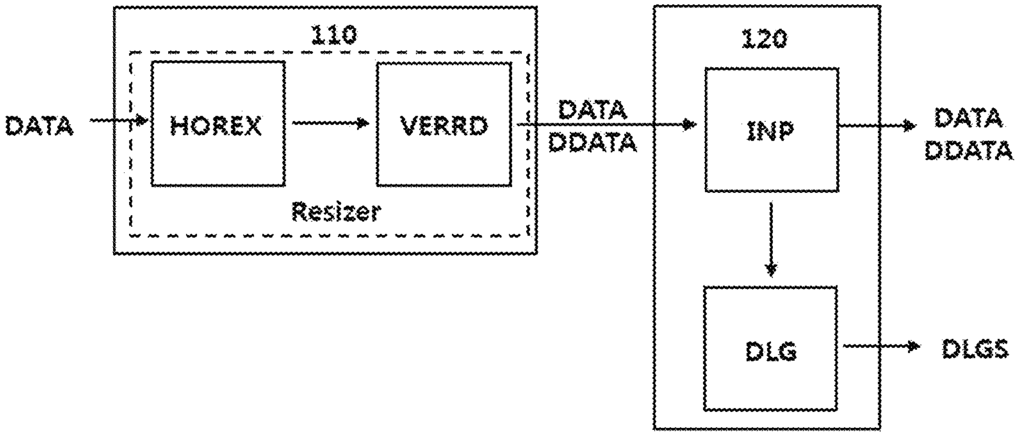

FIGS. 21 and 22 are diagrams illustrating some of elements of an apparatus according to an embodiment of the present disclosure. A function and an operation of the apparatus illustrated in FIGS. 21 and 22 are as described above, and thus, elements performing functions and operations and an apparatus including the elements will be mainly described below.

As illustrated in FIGS. 21 and 22, a display apparatus according to an embodiment may include an input processor INP, a resolution resizer, and a mode change unit DLG, so as to easily implement an image input at various frequencies and resolutions and minimize a degradation in image quality.

The resolution resizer may extend or reduce a vertical resolution and a horizontal resolution, based on a horizontal scaler and a vertical scaler. Hereinafter, however, for convenience of description, only a horizontal resolution extension unit HOREX and a vertical resolution reduction unit VERRD included in the resolution resizer are illustrated and described.

When a resolution of a first data signal DATA corresponds to FHD or QHD, the resolution resizer may change a horizontal resolution or a horizontal resolution and a vertical resolution along with image processing needed for driving of the first data signal DATA, and thus, may output a second data signal DDATA.

For example, when a resolution of the first data signal DATA corresponds to FHD, the resolution resizer may extend only a horizontal resolution of the first data signal DATA by using the horizontal resolution extension unit HOREX, and thus, may output the second data signal DDATA. Also, when a resolution of the first data signal DATA corresponds to QHD, the resolution resizer may extend a horizontal resolution of the first data signal DATA by using the horizontal resolution extension unit HOREX and may reduce a vertical resolution of the first data signal DATA by using the vertical resolution reduction unit VERRD, and thus, may output the second data signal DDATA.

The resolution resizer, as in FIG. 21, may be included in the timing controller 120, or may be included in the image supply unit 110 as in FIG. 22.

In a case which is configured as in FIG. 21, the input processor INP may analyze a characteristic (a resolution, a frequency, etc.) of the first data signal DATA and may perform processing based thereon. When it is required to change a resolution on the basis of the characteristic of the first data signal DATA, the input processor INP may transfer the first data signal DATA to the resolution resizer, and when it is not required to change a resolution, the input processor INP may perform only desired image processing and may intactly output (bypass) an image.

For example, when a resolution of the first data signal DATA corresponds to UHD, the input processor INP may bypass image processing so that only image processing needed for driving of the first data signal DATA is performed. In this case, the mode change unit DLG may not output a mode change signal through a signal line DLGS.

On the other hand, when a resolution of the first data signal DATA corresponds to FHD or QHD, the input processor INP may transfer the first data signal DATA to the resolution resizer so that a resolution is changed. In this case, the mode change unit DLG may output a first mode change signal or a second mode change signal through the signal line DLGS.

In a case which is configured as in FIG. 22, the input processor INP may intactly output the first data signal DATA or the second data signal DDATA. When the first data signal DATA is input, the input processor INP may deactivate the mode change unit DLG so that the mode change signal is not output through the signal line DLGS. On the other hand, when the second data signal DDATA is input, the input processor INP may activate and control the mode change unit DLG so that the first mode change signal or the second mode change signal is output through the signal line DLGS, based on a resolution of an image.

Hereinabove, the present disclosure may easily implement an image input at various frequencies and resolutions and may minimize a degradation in image quality. Also, the present disclosure may easily implement an image input at various frequencies and resolutions, based on an asymmetrical driving method where a display panel is driven alternately in time and space, and may decrease the cost for developing products.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure and following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising:

a display panel configured to display an image;

a gate driver configured to supply gate signals to the display panel;

a timing controller configured to control an output pattern of the gate driver so that the gate signals are applied one by one per one gate line or are applied one by one per two gate lines, based on an image input from the outside; and a resolution resizer configured to change at least one of a horizontal resolution and a vertical resolution, based on the image input from the outside, wherein, when a first image having a lower resolution than a displayable resolution of the display panel is input, the resolution resizer changes the horizontal resolution, when changing of the horizontal resolution is performed by the resolution resizer, the timing controller controls the gate driver so that the gate signals are applied one by one per at least two gate lines, wherein, when a second image having a lower resolution than a displayable resolution of the display panel and a higher resolution than a resolution of the first image is input, the resolution resizer changes the horizontal resolution and the vertical resolution, and when changing of the horizontal resolution and the vertical resolution is performed by the resolution resizer, the timing controller controls the gate driver so that a portion where the gate signals are applied one by one per one gate line and a portion, where the gate signals are applied one by one per at least two gate lines, are provided.

2. The display apparatus of claim 1, wherein, when changing of the horizontal resolution and the vertical resolution is performed by the resolution resizer, the timing controller changes a driving mode so that a frame of the display panel is divided into a first group frame and a second group frame, which are continuous, and driven.

3. The display apparatus of claim 2, wherein, based on the dividing of the frame into the first group frame and the second group frame, the timing controller controls the gate driver so that a position of a portion where the gate signals are applied one by one per one gate line and a position of a portion, where the gate signals are applied one by one per at least two gate lines, are alternated.

4. The display apparatus of claim 1, wherein a portion where the gate signals are applied one by one per one gate line and a portion, where the gate signals are applied one by one per at least two gate lines, are three gate lines vertically adjacent to one another in the display panel.

5. The display apparatus of claim 1, further comprising a mode change circuit configured to change a mode change signal according to the resolution of the image input from the outside, wherein the mode change circuit is included in the timing controller.

6. The display apparatus of claim 5, wherein the gate driver includes a shift register configured to output the gate signals, and an output change circuit included in the shift register and configured to control the output of the gate signals in response to the mode change signal.

7. The display apparatus of claim 6, further comprising a signal line connected between the mode change circuit and the output change circuit.

8. A driving method of a display apparatus, the driving method comprising:

changing at least one of a horizontal resolution and a vertical resolution when an image having a lower resolution than a displayable resolution of a display panel is input; and applying gate signals to the display panel one by one per one gate line or either one by one per at least two gate lines, based on the changing of the resolution of the image, wherein, when the horizontal resolution and the vertical resolution are changed based on the image, the display panel is driven by dividing a frame into a first group frame and a second group frame which are continuous, and wherein, based on the dividing of the frame into the first group frame and the second group frame, a position of a portion where the gate signals are applied one by one per one gate line and a position of a portion, where the gate signals are applied one by one per at least two gate lines, are alternated.

9. The driving method of claim 8, wherein the first portion where the gate signals are applied one by one per one gate line and the second portion, where the gate signals are applied one by one per at least two gate lines, are three gate lines vertically adjacent to one another in the display panel.

* * * * *